United States Patent
Galas (10) Patent No.: US 10,774,546 B2
(45) Date of Patent: Sep. 15, 2020

(54) RESILIENT FIXING ELEMENT AND A SKIRTING BOARD FIXING SYSTEM COMPRISING A SKIRTING BOARD AND SUCH A FIXING ELEMENT

(71) Applicant: Adam Galas, Suwalki (PL)

(72) Inventor: Adam Galas, Suwalki (PL)

( * ) Notice: Subject to any disclaimer, the term of this patent is extended or adjusted under 35 U.S.C. 154(b) by 0 days.

(21) Appl. No.: 16/091,141

(22) PCT Filed: Apr. 4, 2017

(86) PCT No.: PCT/IB2017/051905
§ 371 (c)(1),
(2) Date: Oct. 4, 2018

(87) PCT Pub. No.: WO2017/175121
PCT Pub. Date: Oct. 12, 2017

(65) Prior Publication Data
US 2019/0127992 A1    May 2, 2019

(30) Foreign Application Priority Data

Apr. 5, 2016 (PL) .......................................... 416755

(51) Int. Cl.
*E04F 19/04*    (2006.01)
*E04F 15/02*    (2006.01)
(Continued)

(52) U.S. Cl.
CPC .... *E04F 19/0463* (2013.01); *E04F 15/02027* (2013.01); *F16B 2/22* (2013.01); *F16B 5/121* (2013.01); *F16B 5/125* (2013.01)

(58) Field of Classification Search
CPC ... E04F 15/02027; E04F 19/0463; F16B 2/22; F16B 5/121; F16B 5/125
(Continued)

(56) References Cited

U.S. PATENT DOCUMENTS 5,444,953 A * 8/1995 Koenig ................... E04F 13/18
                                                      52/255
6,115,982 A * 9/2000 Lindenberg .......... A47B 77/022
                                                      52/272
(Continued)

FOREIGN PATENT DOCUMENTS

CA      2865276 A1 * 8/2013  ........ E04F 15/02027
CH      429111 A      1/1967
(Continued)

OTHER PUBLICATIONS

Russian Search Report dated Jul. 2, 2019, in corresponding Russian application.
(Continued)

*Primary Examiner* — Joshua J Michener
*Assistant Examiner* — James J Buckle, Jr.
(74) *Attorney, Agent, or Firm* — Browdy and Neimark, PLLC (57) ABSTRACT

A resilient fixing element for releasably connecting a skirting board with a floor covering, including a first arm located under the floor covering, a second arm located over the floor covering and to be engaged with the skirting board, a connecting face connecting the first arm with the second arm, and a resilient abutment element located in an internal space between the arms. The resilient abutment element is moveable between a first position in which it is constrained and blocked lying along the connecting face and a second position in which it is extended into the internal space. An engagement element is provided to block the abutment element in its first position and to release the abutment element into its second position. A skirting board fixing system includes a skirting board and the resilient fixing element as described, the skirting board consisting of a wall (Continued)

abutting covering arm and a floor abutting arm, the latter being engaged with the fixing element.

34 Claims, 9 Drawing Sheets

(51) Int. Cl.
  *F16B 2/22* (2006.01)
  *F16B 5/12* (2006.01)

(58) Field of Classification Search
  USPC ........ 52/281, 282.1, 287.1, 288.1, 289, 290, 52/506.05, 718.03; 24/289
  See application file for complete search history.

(56) References Cited

U.S. PATENT DOCUMENTS

| | | | | |
|---|---|---|---|---|
| 6,786,016 | B1 * | 9/2004 | Wood .................. | A01M 1/2011 43/107 |
| 7,594,368 | B2 * | 9/2009 | Kurz .................. | E04F 19/0468 24/289 |
| 2009/0151134 | A1 * | 6/2009 | Neuhofer, Jr. ...... | E04F 19/0436 24/292 |
| 2010/0071288 | A1 * | 3/2010 | Jun .................... | E04F 19/0468 52/288.1 |
| 2011/0126482 | A1 * | 6/2011 | Galas .................. | E04F 19/0463 52/288.1 |

FOREIGN PATENT DOCUMENTS

| | | | | |
|---|---|---|---|---|
| CN | 201381612 | Y | 1/2010 | |
| CN | 102127960 | A | 7/2011 | |
| DE | 9301324 | U1 * | 4/1993 | ........ E04F 15/02027 |
| DE | 102007002592 | B3 | 7/2008 | |
| DE | 202010009553 | U1 | 11/2010 | |
| EP | 2169143 | A2 | 3/2010 | |
| PL | 61409 | Y1 | 5/2005 | |
| PL | 220426 | B1 | 10/2015 | |
| SU | 705091 | A1 | 12/1979 | |
| WO | 2005116364 | A1 | 12/2005 | |
| WO | 2014040102 | A1 | 3/2014 | |

OTHER PUBLICATIONS

Chinese Office Action dated Mar. 6, 2020 for Chinese Patent Application No. 2017800221523 with English Translation.

* cited by examiner

RESILIENT FIXING ELEMENT AND A SKIRTING BOARD FIXING SYSTEM COMPRISING A SKIRTING BOARD AND SUCH A FIXING ELEMENT

The present invention concerns the domain of connecting skirting boards to floor coverings.

In particular, the present invention concerns a resilient fixing element and a skirting board fixing system comprising a skirting board and such a resilient fixing element.

A skirting board fixing system used for mounting skirting boards is known from a Polish patent PL220426 in the name of the present applicant. One of the components of the system is an arcuate fixing element having a first arm to be located under a floor covering and a second arm to be located on the floor covering, the second arm being spap-engaged with a base arm of the skirting board. The system described in PL220426 allows the fixing element to be mounted e.g. on a flooring panel during its installation so that the skirting board may then be installed against a wall without the use of any tools. Such a fixing element operates most efficiently if it is constantly pressed against the wall so that it simultaneously presses the mounted skirting board against the wall. Hence, in a preferred variant of the invention according to PL220426 the fixing element is provided with a horizontal resilient member that exerts pressure on the front edge of the flooring element.

However, the described system has one disadvantage. Although the fixing elements operate correctly after installation, they tend to be difficult to be mounted. Due to the fact that the resilient member is constantly tensed and the fixing elements must be spaced by several tens of centimeters, the installed flooring panels result to be too far away from the wall. The mounting of the fixing elements on the panels is also difficult because they are constantly pushed away from the wall by their resilient members. This is particularly onerous at the final stage of installation, when the last panels are being laid close to the wall. Inicially, such a panel is oriented almost vertically and snap-engaged with a lastly laid panel, then the fixing elements are mounted, and finally the last panel is laid. In such a situation the fixing elements tend to jam the panels, sometimes they fall down and need correction or pressing in order to be finally correctly installed.

The aim of the invention was to eliminate the above mentioned problems.

According to the invention a resilient fixing element for releasingly connecting a skirting board with a floor covering is provided, the fixing element comprising a first arm to be located under the floor covering, a second arm to be located over the floor covering and to be engaged with the skirting board, and a connecting face joining the first arm with the second arm, the fixing element further comprising at least one resilient abutment element located in an internal space between the arms.

The resilient fixing element is characterized in that the at least one resilient abutment element may take a first position in which it is constrained and blocked lying along the face and a second position in which it is extended into said internal space, wherein the fixing element is provided with at least one engagement means enabling to block the abutment element in its first position and to release the abutment element into its second position.

Preferably, the abutment element constitutes an integral part of the fixing element and it is formed by cutting a strip of the material of the connecting face, wherein in the second position the abutment element has a shape that is curved towards said internal space of the fixing element.

Optionally, the abutment element may constitute a separate strip of material connected to the connecting face.

The engagement means preferably constitutes an integral part of the fixing element and it is formed by cutting a strip of the material of the fixing element, wherein said strip of material has a curved shape so that its free end engages the abutment element in its second positon.

The abutment element may comprise a blocking detent for retaining the engagement means.

Optionally, the engagement means constitutes an integral part of the fixing element and it is formed by cutting a strip of the material of the fixing element, the engagement means comprising an additional blocking detent for retaining the abutment element.

Optionally, the engagement means is a detent extending into said internal space of the fixing element, the fixing element comprising a cut out enabling the abutment element to be released into its second position from the outside of the fixing element.

Preferably, said detent is formed by a notch made in the material of the fixing element.

The fixing element in which the engagement means is a detent extending into the internal space of the fixing element may by further provided with a control member cooperating with the abutment element in order to release it into its second position.

Preferably, said detent is a separate element connected to the fixing element.

The fixing element preferably comprises several spaced apart abutment elements and several engagement means, each cooperating with a corresponding abutment element.

Also preferably, the fixing element comprises at least one securing detent for immobilizing the fixing element against a wall, the securing detents preferably consisting of outwardly bent angular notches made in the fixing element material.

According to the invention, a skirting board fixing system comprising a skirting board and the resilient fixing element according to the invention is provided, in which the skirting board consists of a wall abutting covering arm and a floor abutting arm, the floor abutting arm being engaged with the fixing element.

The system according to the invention is characterized in that in an assembled state of the system, when the fixing element connects the skirting board with the floor covering that is located by the wall, the abutment element is in its second position and exerts pressure on the front side of the floor covering, the pressure being directed along the arms of the fixing element.

The resilient fixing element and the fixing system according to the invention provide a reliable connection of a skirting board with a floor covering. The advantage of the invention is that upon installation the skirting board is constantly pressed against the wall due to the pressure exerted by the abutment elements of the fixing elements, which however do not interfere with the installation.

The fixing element and the system according to the invention are presented on the appended drawings in which.

Figure 1:
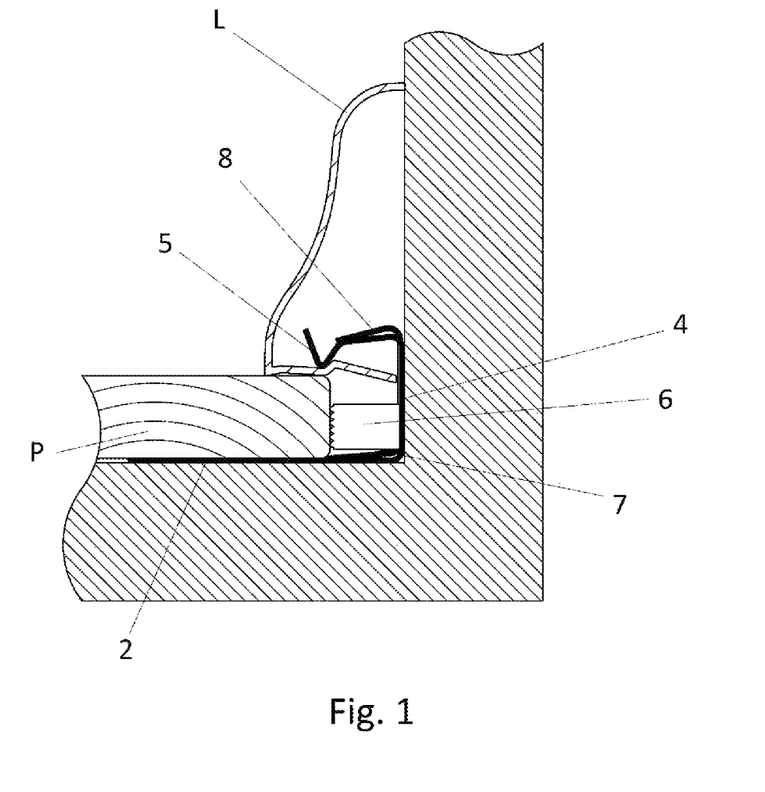
FIG. 1 presents a partially sectional view of the system according to the invention.

As shown in FIG. 1, the system according to the invention comprises a skirting board L and a resilient fixing element 1, that form upon installation a longitudinal finishing element for a floor covering P, e.g. floor panels. The skirting board L may have a shape e.g. as disclosed in PL220426 and may have a wall abutting covering arm and a floor abutting base arm provided with an engagement bent extending along its free edge. The fixing element 1 according to the present invention comprises a first arm 2 to be located under a floor covering P and a second arm 3 to be located over the floor covering P and engaged with the skirting board L by means of a bent 5. The arms 2 and 3 are connected by a connecting face 4. The fixing element 1 further comprises a resilient abutment element 6. The function of the abutment element 6 is to exert pressure against a front side of the floor covering P once the fixing element 1 has been installed thereon and said floor covering P has been laid by a wall S. Considering that the second arm 3 is engaged with the skirting board L, the pressure exerted by the abutment element 6 on the front face of the floor covering P results in that the skirting board L is pressed against the wall S. The fixing element 1 of the system shown in FIG. 1 is provided with an engagement means 7 that blocks the constrained abutment element 6 extending along the face 4 during installation. It also serves to release the abutment element 6 once the fixing element 1 has been mounted on the front face of the floor covering element installed in the last row by the wall S. In FIG. 1 a partially sectional view is shown of the system comprising the fixing element 1 according to the embodiment shown in FIGS. 7 and 8, as will be described below in reference to the operation of the fixing element according to the invention.

Figure 2A:
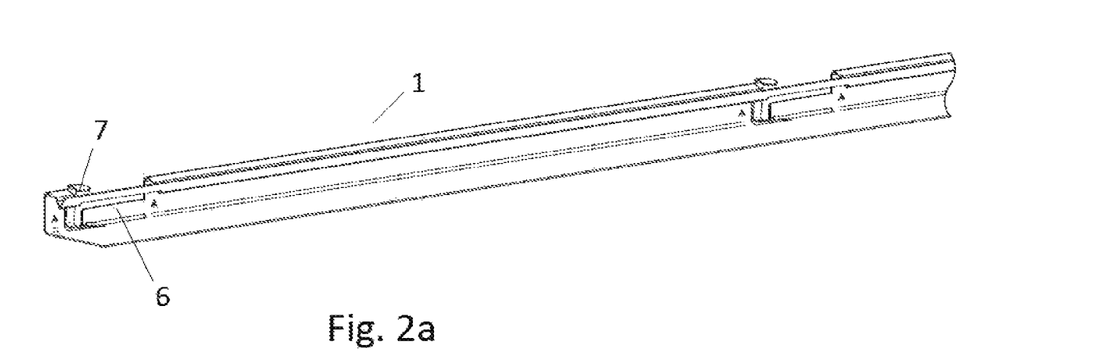
FIG. 2a and FIG. 2b present perspective views of two sections of the resilient fixing element according to two embodiments of the invention.
Figure 2B:
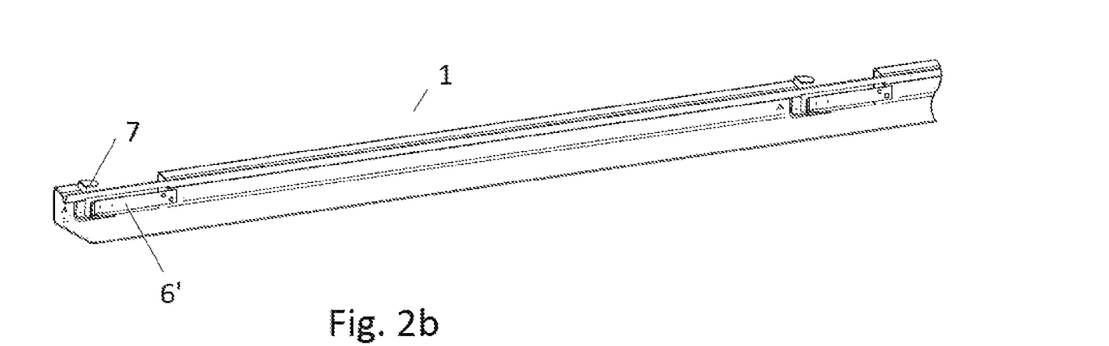

FIGS. 2a and 2b show perspective views of longer sections of the fixing element 1 according to the invention comprising two abutment elements 6 and two engagement means 7 each. The abutment element 6 is an integral part of the fixing element 1 shown in FIG. 2a, while the abutment element 6' of the fixing element shown in FIG. 2b is a separate strip of material attached to the connecting face 4 of the fixing element (it will be described in detail in reference to the next figures).

Figure 3:
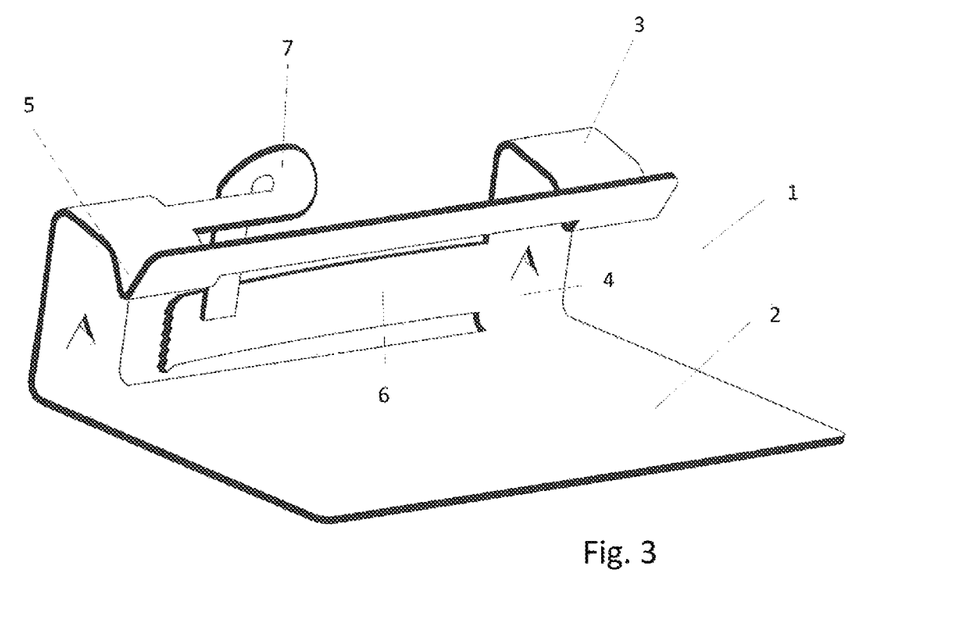
FIG. 3 presents a perspective view of a section of the fixing element according to a first embodiment of the invention, in a state ready for installation.
Figure 4:
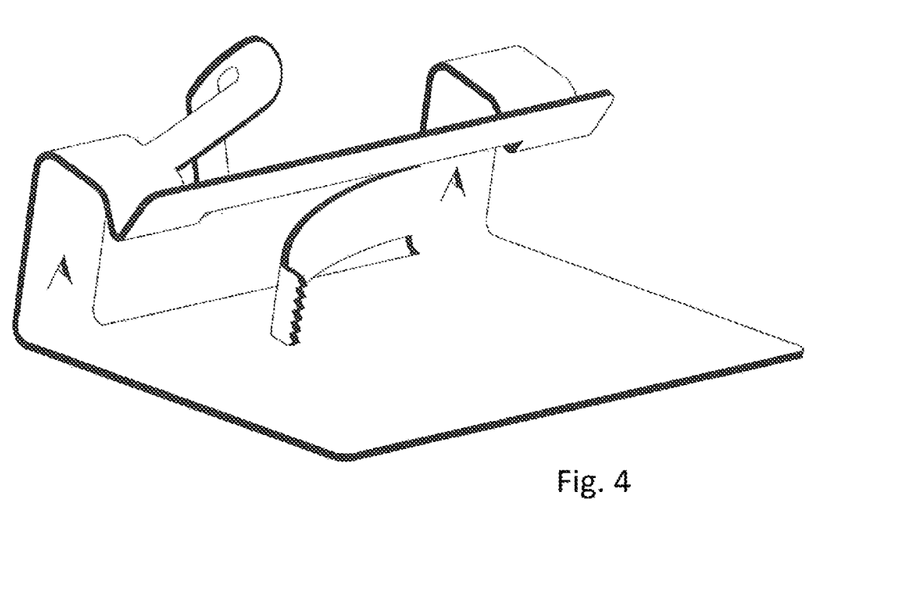
FIG. 4 presents a perspective view of the section of the fixing element shown in FIG. 3, with its abutment element extending freely.

FIG. 3 and FIG. 4 show perspective views of a section of the fixing element 1 according to the first embodiment of the invention, respectively in a state ready for installation and with the abutment element 6 extending freely. In this embodiment the fixing element 1 constitutes a one-piece profile element comprising two arms, the first arm 2 and the second arm 3 joined by the connecting face 4. The integral abutment element 6 and the integral engagement means 7 are formed from the material of the fixing element. The arm 2 is to be located under the floor covering P and the arm 3 is to be located over the floor covering P so that both arms and the connecting face 4 surround the edge, i.e. front face of the floor covering that is introduced into the internal space of the fixing element 1 limited by its arms. The arm 3 is engaged with the skirting board L in a typical way by means of a suitable bent 5 extending along its fee edge. The fixing element 1 is made of a resilient material e.g. steel or optionally of a plastic material having suitable elasticity and resistance.

The abutment element 6 is formed as a straight strip cut off a resilient material of the connecting face 4 of the fixing element 1. The abutment element 6 has been formed in such a way that in a non-constrained state it has a curved shape and extends into the internal space of the fixing element 1. In a first mounting position the abutment element 6 is constrained; it is oriented by force along the face 4 and blocked by the engagement means 7. On the other hand, once the fixing element 1 has been mounted on the edge of the flooring element and the flooring element has been placed by the wall S, the engagement means 7 is unblocked so as to release the abutment element 6 which in turn tends to elastically return to its non-constrained second position and presses against the front face of the floor covering P.

The engagement means 7 is also formed as a strip cut off a resilient material of the fixing element 1. Said strip is bent as shown in FIG. 3 so that its free end is directed transversally to the abutment element 6, the engagement means 7 being long enough to retain the abutment element 6 in its first position. The curved central part of the engagement means 7 constitutes a handle for an operator.

The fixing element 1 operates as follows. Before installation and engagement with the skirting board L, the free end of the engagement means 7 blocks the free end of the abutment element 6 so as to retain it in its first position, substantially along the face 4. In this state the fixing element 1 is mounted on the edge of e.g. a floor panel of the last row of the floor covering P to be placed by the wall S which means that the fixing element 1 will abut the wall S. The abutment element 6 will not interfere with the mounting of the fixing element 1 on the panel because it does not extend into its internal space. When the last row of panels with their fixing elements mounted has been laid by the wall S, the operator tilts each engagement means 7 upwards by gripping its curved part so as to release the blocked abutment element 6. When released, the resilient abutment element 6 tends to return to its second position as shown in FIG. 4. In this situation the abutment element 6 starts to exert pressure on the front edge of the floor covering P (the last row of the panels) in a direction along the floor covering P. Then the operator mounts the skirting board L by engaging its base arm with the upper second arm 3 of the fixing element 1. Due to this engagement the skirting board L is pressed against the wall S.

The material of which the fixing element 1 is made must have suitably selected elastic properties. First, the fixing element 1 must be able to be mounted on the edge of the floor covering and engaged with the skirting board L. Next, the cut off strips of the material constituting the abutment elements 6 and the engagement means 7 must be able to be suitably shaped and bent in order to perform their functions. The abutment element 6 must exert the required pressure on the front face of the floor covering P, while the engagement means 7 must on one hand retain the blocked abutment element 6, and on the other hand must enable manual bending in order to release the abutment element 6. A specialist will be able to select a suitable material for the fixing element 1 according to the invention, meeting the above requirements.

The engagement means 7 may be shaped in various ways. Other embodiments of the engagement means 7 are shown in FIGS. 5-15.

Figure 5:
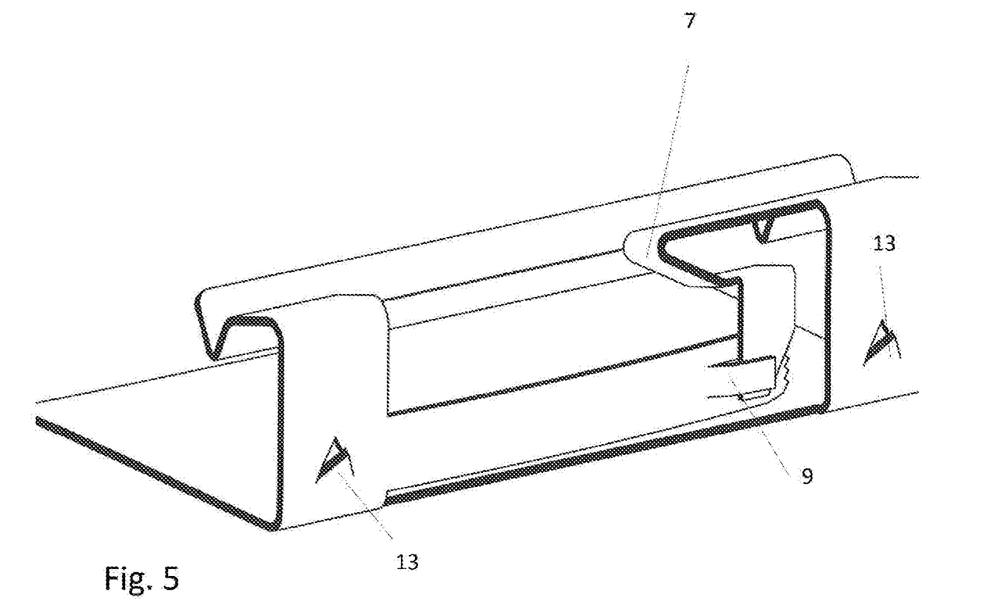
FIG. 5 presents a perspective view of a section of the fixing element according to a second embodiment of the invention, in a state ready for installation.
Figure 6:
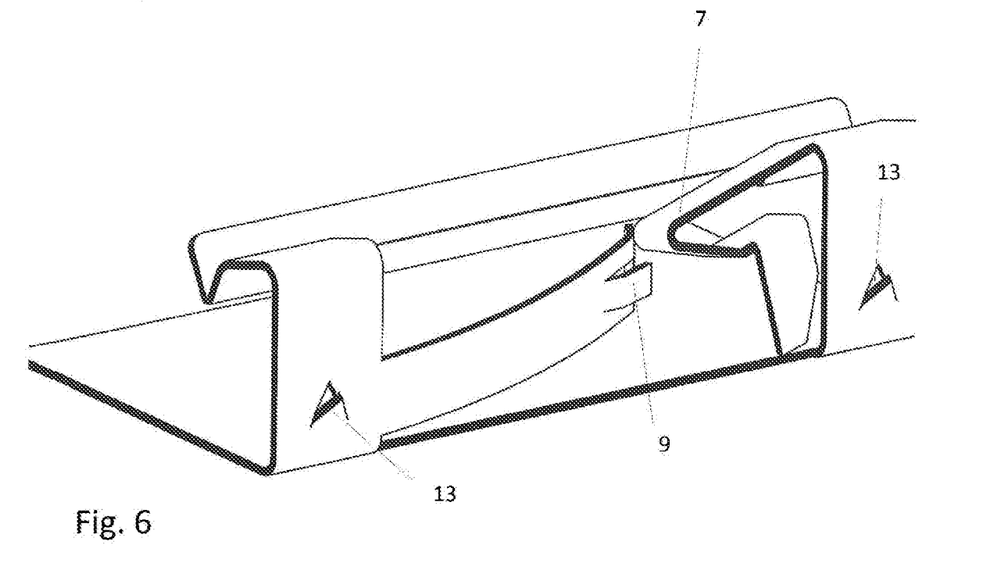
FIG. 6 presents a perspective view of the section of the fixing element shown in FIG. 5, with its abutment element extending freely.

The engagement means 7 shown in FIGS. 5 and 6, presenting the second embodiment of the fixing element 1 in a way similar to FIGS. 3 and 4, has a slightly different shape, and the abutment element 6 is additionally provided with a detent 9 on its free end. Such a shape of the engagement means 7 enables the abutment element 6 to be released by pressing the engagement means 7 downwards into the position shown in FIG. 6, i.e. in a direction opposite to the direction of tilting it in the embodiment of FIGS. 3 and 4.

The fixing element 1 may also be provided with additional securing detents designated by the number 13 in FIGS. 5 and 6, also shown in other figures. These detents 13, located on the face 4, help to immobilize the fixing element in relation to the wall S. The securing detents 13 may be realized as angular notches made in the of the fixing element material that are bent outwardly, as in the described embodiment.

Figure 7:
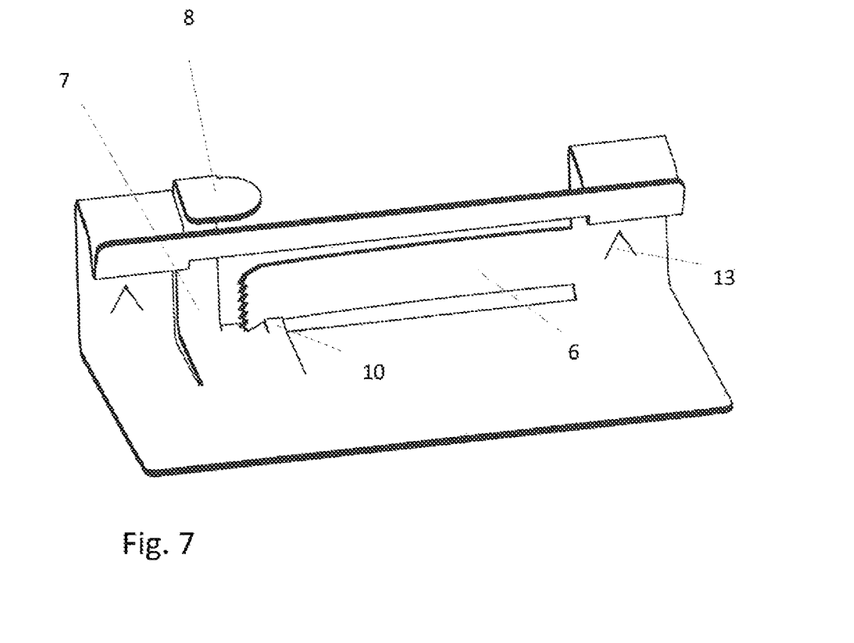
FIG. 7 presents a perspective view of a section of the fixing element according to a third embodiment of the invention, in a state ready for installation.
Figure 8:
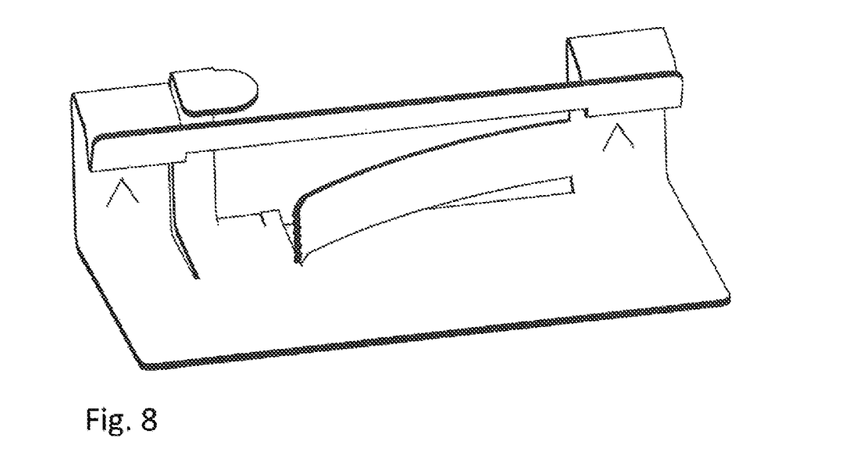
FIG. 8 presents a perspective view of the section of the fixing element shown in FIG. 7, with its abutment element extending freely.

Another embodiment of the engagement means 7 is shown in the analogous views of FIGS. 7 and 8. In this third embodiment the engagement means 7 constitutes a strip-like fragment of the fixing element 1 that has been cut off substantially transversally to the abutment element 6. The end of said strip-like fragment has been bent in such a way that it forms a button 8 and an additional detent 10 has also been notched. This shape of the engagement means 7 allows to release the abutment element 6 by pressing the button 8 downwards, as shown by an arrow in FIG. 7.

Figure 9:
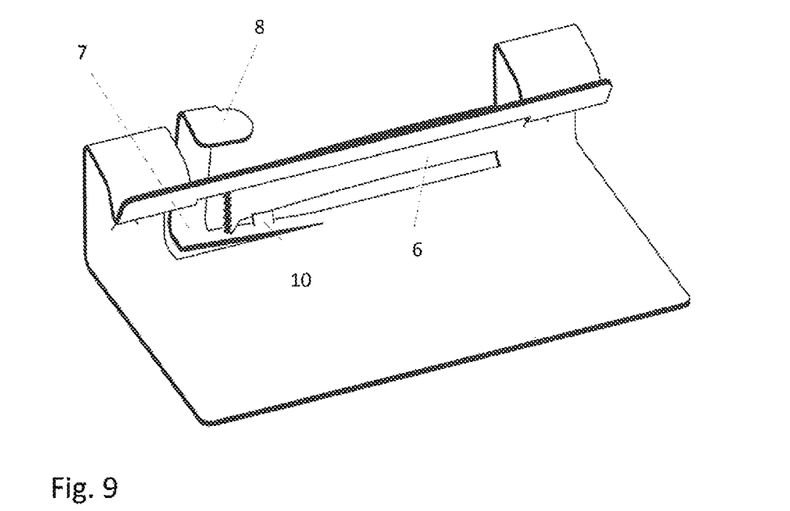
FIG. 9 presents a perspective view of a section of the fixing element according to a fourth embodiment of the invention, in a state ready for installation.
Figure 10:
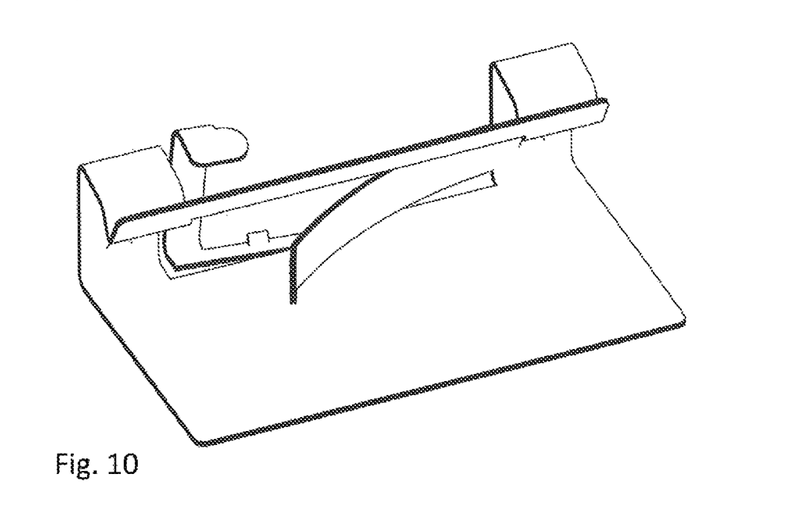
FIG. 10 presents a perspective view of the section of the fixing element shown in FIG. 9, with its abutment element extending freely.

Another, fourth embodiment is shown in the analogous views of FIGS. 9 and 10. Here again, the abutment element 6 is an integral stripe cut off the material of the fixing element, and the engagement means 7 has an end bent in such a way that it forms a button 8 and an additional detent 10 has also been notched. The engagement means 7 constitutes a fragment of the material of the fixing element 1 that has been cut off—in part transversally and in part along the abutment element 6.

Figure 11:
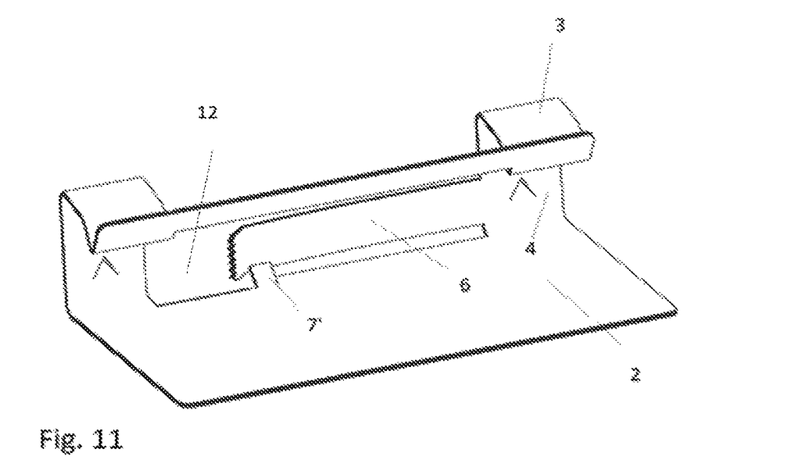
FIG. 11 presents a perspective view of a section of the fixing element according to a fifth embodiment of the invention, in a state ready for installation.
Figure 12:
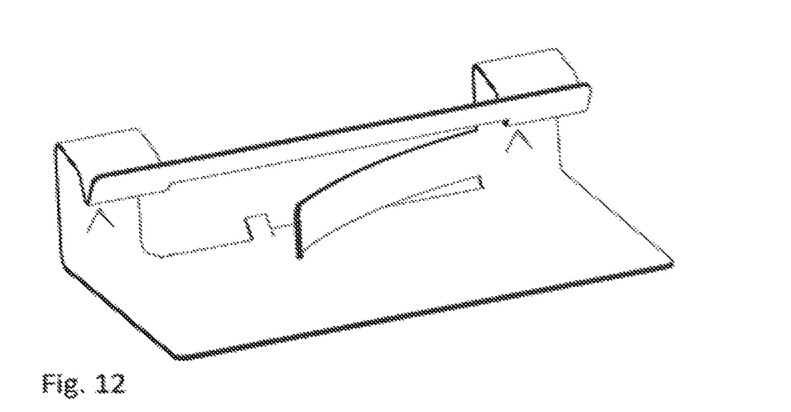
FIG. 12 presents a perspective view of the section of the fixing element shown in FIG. 11, with its abutment element extending freely.

FIGS. 11 and 12 present a section of the fixing element according to the fifth embodiment of the invention. In this embodiment the engagement means is a detent 7'. The detent 7' may be formed by notching the material of the fixing element 1 as shown in FIGS. 11 and 12. Optionally, the detent 7' may constitute a separate element attached to the fixing element 1 by any suitable means (not shown). The abutment element 6 may be released to its second position through an opening 12 cut out in the fixing element 1; the abutment element 6 is released by means of an additional tool that is introduced through said opening 12.

Figures 13, 14:
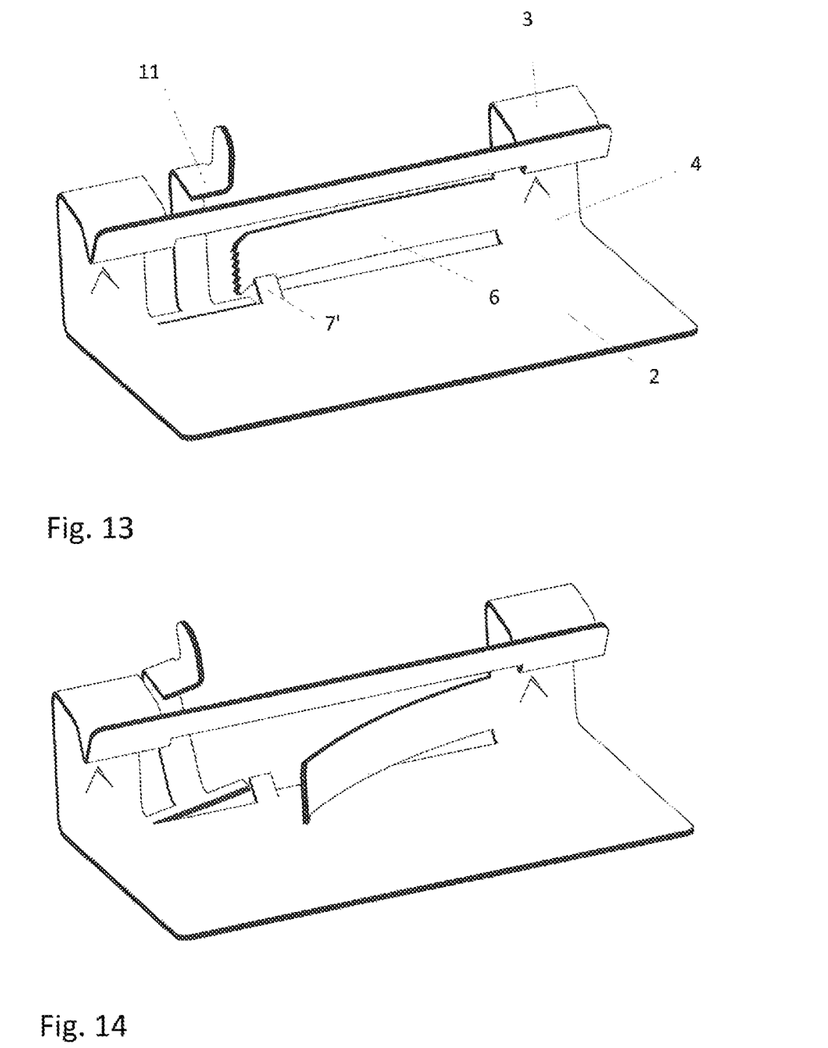
FIG. 13 and FIG. 14 show perspective views of a section of the fixing element according to a sixth embodiment of the invention, respectively in a state ready for installation and with its abutment element extending freely.

In a preferred variant of this embodiment, shown in FIGS. 13 and 14, the fixing element 1 is further provided with a control member 11 cooperating with the abutment element 6 in order to release it into its second position. It means in practice that during tilting of the free end of the control member 11 into the positon shown in FIG. 14, its opposite end interferes with the free end of the abutment element 6 raising it and causing its release from the detent 7'.

Figure 15A:
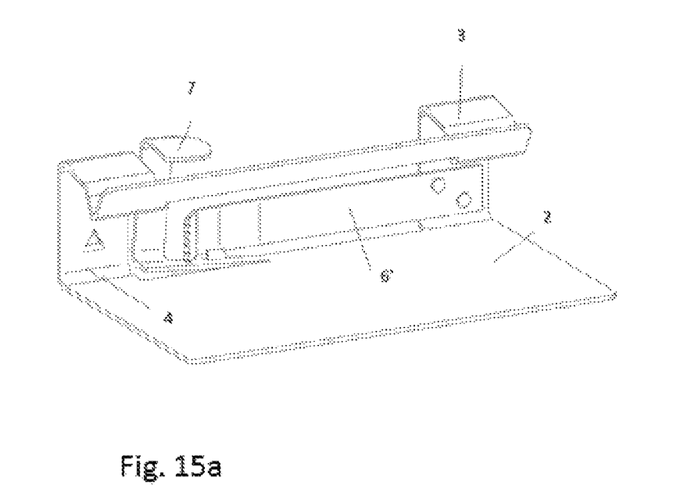
FIG. 15a and FIG. 15b show perspective views of the sections of two variants of the fixing element according to a seventh embodiment of the invention.
Figure 15B:
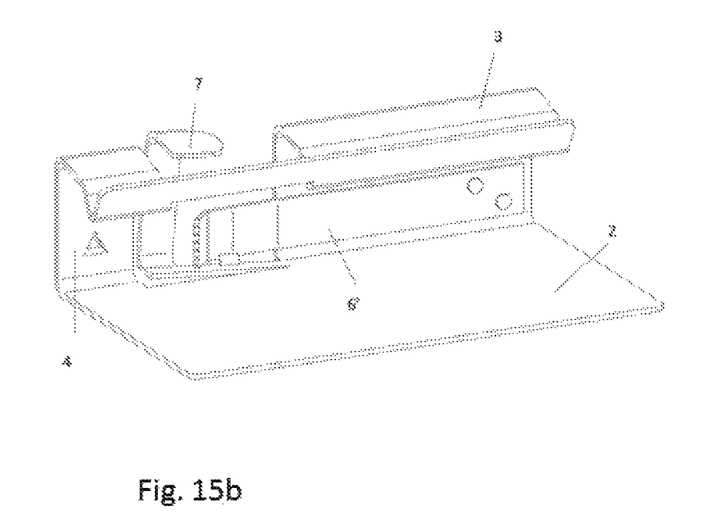

FIGS. 15a and 15b show perspective views of the sections of two variants of the fixing element according to a seventh embodiment of the invention, which is similar to the fourth embodiment shown in FIGS. 9 and 10. In this embodiment the abutment element 6' is not an integral part of the fixing element 1, but it is a separate element attached thereto. It is a strip of a suitable resilient material attached at one end to the connecting face 4 of the fixing element 1 on its side facing its internal space by means of suitable connecting means, e.g. rivets. The opening cut out in the material of the fixing element 1 may have various sizes; as shown in FIG. 15a the opening is relatively big, while in FIG. 15b it is smaller.

The invention claimed is:

1. A resilient fixing element for releasably connecting a skirting board with a floor covering, the resilient fixing element comprising:
    a first arm to be located under the floor covering,
    a second arm to be located over the floor covering and to be engaged with the skirting board,
    a connecting face joining the first arm with the second arm,
    at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space, and
    at least one engagement means disposed to block the at least one resilient abutment element in said first position during installation and to release the at least one resilient abutment element into said second position once the resilient fixing element has been mounted on a front face of the floor covering installed in a last row near a wall.

2. The resilient fixing element according to claim 1, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

3. The resilient fixing element according to claim 1, wherein the at least one resilient abutment element constitutes a separate strip of material connected to the connecting face.

4. The resilient fixing element according to claim 1, wherein the at least one engagement means constitutes an integral part of the resilient fixing element and comprises a strip of the material cut from the resilient fixing element, wherein said strip of material has a curved shape and a free end that engages the at least one resilient abutment element in said first position.

5. The resilient fixing element according to claim 4, wherein the at least one resilient abutment element comprises a blocking detent for retaining the at least one engagement means.

6. The resilient fixing element according to claim 1, wherein the at least one engagement means constitutes an integral part of the resilient fixing element and comprises a strip of the material cut from the resilient fixing element, the at least one engagement means comprising an additional blocking detent for retaining the at least one resilient abutment element.

7. The resilient fixing element according to claim 1, wherein the at least one engagement means is a detent extending into said internal space of the resilient fixing element, the resilient fixing element comprising a cut out enabling the at least one resilient abutment element to be released into said second position from the outside of the fixing element.

8. The resilient fixing element according to claim 7, wherein the detent comprises a notch defined in the resilient fixing element.

9. The resilient fixing element according to claim 7, further comprising a control member cooperating with the at least one resilient abutment element to release the at least one resilient abutment element into said second position.

10. The resilient fixing element according to claim 7, wherein the detent is a separate element connected to the resilient fixing element.

11. The resilient fixing element according to claim 1, wherein the at least one resilient abutment element comprises a plurality of spaced apart abutment elements and the at least one engagement means comprises a plurality of engagement elements, each of the plurality of engagement elements cooperating with a corresponding one of the plurality of spaced apart abutment elements.

12. The resilient fixing element according to claim 1, further comprising at least one securing detent for immobilizing the resilient fixing element.

13. A skirting board fixing system comprising a skirting board and the resilient fixing element according to claim 1, the skirting board comprising a wall abutting covering arm and a floor abutting arm, the floor abutting arm being engaged with the resilient fixing element, wherein in an assembled state of the system, when the resilient fixing element connects the skirting board with the floor covering that is located by the wall, the at least one resilient abutment element is in said second position and exerts pressure on the front side of the floor covering, the pressure being directed along the arms of the fixing element.

14. The resilient fixing element according to claim 12, wherein the at least one securing detent comprises outwardly bent angular notches made in the resilient fixing element.

15. A resilient fixing element for releasably connecting a skirting board with a floor covering, the resilient fixing element comprising:
a first arm to be located under the floor covering,
a second arm to be located over the floor covering and to be engaged with the skirting board,
a connecting face joining the first arm with the second arm,
at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space,
at least one engagement means disposed to block the at least one resilient abutment element in said first position and to release the at least one resilient abutment element into said second position, and
at least one securing detent located on the connecting face and configured to immobilize the resilient fixing element in relation to a wall.

16. The resilient fixing element according to claim 15, wherein the at least one securing detent comprises outwardly bent angular notches made in the resilient fixing element.

17. The resilient fixing element according to claim 15, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

18. The resilient fixing element according to claim 15, wherein the at least one resilient abutment element constitutes a separate strip of material connected to the connecting face.

19. A resilient fixing element for releasably connecting a skirting board with a floor covering, the resilient fixing element comprising:
a first arm to be located under the floor covering,
a second arm to be located over the floor covering and to be engaged with the skirting board,
a connecting face joining the first arm with the second arm,
at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space,
at least one engagement means disposed to block the at least one resilient abutment element in said first position and to release the at least one resilient abutment element into said second position, and
wherein the at least one engagement means constitutes an integral part of the resilient fixing element and comprises a strip of the material cut from the resilient fixing element, wherein said strip of material has a curved shape and a free end that engages the at least one resilient abutment element in said second position.

20. The resilient fixing element according to claim 19, wherein the at least one resilient abutment element comprises a blocking detent for retaining the at least one engagement means.

21. The resilient fixing element according to claim 19, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

22. The resilient fixing element according to claim 19, wherein the at least one resilient abutment element constitutes a separate strip of material connected to the connecting face.

23. A resilient fixing element for releasably connecting a skirting board with a floor covering, the resilient fixing element comprising:
a first arm to be located under the floor covering,
a second arm to be located over the floor covering and to be engaged with the skirting board,
a connecting face joining the first arm with the second arm,
at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space,
at least one engagement means disposed to block the at least one resilient abutment element in said first position and to release the at least one resilient abutment element into said second position, and
wherein the at least one engagement means constitutes an integral part of the resilient fixing element and comprises a strip of the material cut from the resilient fixing element, the at least one engagement means comprising an additional blocking detent for retaining the at least one resilient abutment element.

24. The resilient fixing element according to claim 23, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

25. The resilient fixing element according to claim 23, wherein the at least one resilient abutment element constitutes a separate strip of material connected to the connecting face.

26. A resilient fixing element for releasably connecting a skirting board with a floor covering, the resilient fixing element comprising:
a first arm to be located under the floor covering,
a second arm to be located over the floor covering and to be engaged with the skirting board,
a connecting face joining the first arm with the second arm,
at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space,
at least one engagement means disposed to block the at least one resilient abutment element in said first position and to release the at least one resilient abutment element into said second position, and
wherein the at least one engagement means is a detent extending into said internal space of the resilient fixing element, the resilient fixing element comprising a cut out enabling the at least one resilient abutment element to be released into said second position from the outside of the fixing element.

27. The resilient fixing element according to claim 26, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

28. The resilient fixing element according to claim 26, wherein the at least one resilient abutment element constitutes a separate strip of material connected to the connecting face.

29. The resilient fixing element according to claim 26, wherein the detent comprises a notch defined in the resilient fixing element.

30. The resilient fixing element according to claim 26, further comprising a control member cooperating with the at least one resilient abutment element to release the at least one resilient abutment element into said second position.

31. The resilient fixing element according to claim 26, wherein the detent is a separate element connected to the resilient fixing element.

32. A resilient fixing element for releasably connecting a skirting board with a floor covering, the resilient fixing element comprising:
a first arm to be located under the floor covering,
a second arm to be located over the floor covering and to be engaged with the skirting board,
a connecting face joining the first arm with the second arm,
at least one resilient abutment element located in an internal space between the arms, wherein the at least one resilient abutment element is moveable between a first position in which the at least one resilient abutment element is constrained and blocked lying along the connecting face and a second position in which the at least one resilient abutment element is extended into said internal space,
at least one engagement means disposed to block the at least one resilient abutment element in said first position and to release the at least one resilient abutment element into said second position, and
wherein the at least one resilient abutment element comprises a plurality of spaced apart abutment elements and the at least one engagement means comprises a plurality of engagement elements, each of the plurality of engagement elements cooperating with a corresponding one of the plurality of spaced apart abutment elements.

33. The resilient fixing element according to claim 32, wherein the at least one abutment element constitutes an integral part of the resilient fixing element and comprises a strip of the material cut from the connecting face, wherein in the second position the at least one resilient abutment element has a shape that is curved towards said internal space of the resilient fixing element.

34. The resilient fixing element according to claim 32, wherein the at least one resilient abutment element constitutes a separate strip of material connected to the connecting face.

* * * * *